P. F. GIFFORD.
TRANSMISSION GEARING FOR AUTOMOBILES, &c.
APPLICATION FILED JAN. 16, 1918.

1,299,700.

Patented Apr. 8, 1919.
3 SHEETS—SHEET 2.

P. F. GIFFORD.
TRANSMISSION GEARING FOR AUTOMOBILES, &c.
APPLICATION FILED JAN. 16, 1918.

1,299,700.

Patented Apr. 8, 1919.
3 SHEETS—SHEET 3.

Inventor:
by Percival F. Gifford
Redding, Greeley & Brodlett
Attys.

UNITED STATES PATENT OFFICE.

PERCIVAL F. GIFFORD, OF NEW YORK, N. Y.

TRANSMISSION-GEARING FOR AUTOMOBILES, &c.

1,299,700.  Specification of Letters Patent.  Patented Apr. 8, 1919.

Application filed January 16, 1918. Serial No. 212,133.

*To all whom it may concern:*

Be it known that I, PERCIVAL FREDERICK GIFFORD, a citizen of the Dominion of Canada, at present residing in the borough of Manhattan of the city of New York, in the State of New York, have invented certain new and useful Improvements in Transmission-Gearing for Automobiles, &c, of which the following is a specification, reference being had to the accompanying drawings, forming a part hereof.

The object of this invention is to produce an improved transmission gearing, particularly designed for automobile use but capable of other applications, which shall be capable of yielding any desired speed ahead, between zero and the maximum, and any desired speed in reverse between zero and a smaller maximum. The improved transmission gearing is also simple in construction, composed of relatively few parts, and capable of being made light in weight without sacrifice of strength. In the embodiment of the invention two planetary gears, each of which is substantially of ordinary construction, are combined in such a way as to effect the transmission, at the will of the driver, from one to the other of two alined shafts, of any desired speed between the maximum speed ahead and the maximum speed in reverse. The invention will be more fully explained hereinafter with reference to the accompanying drawings in which it is illustrated, and in which—

Figure 1:
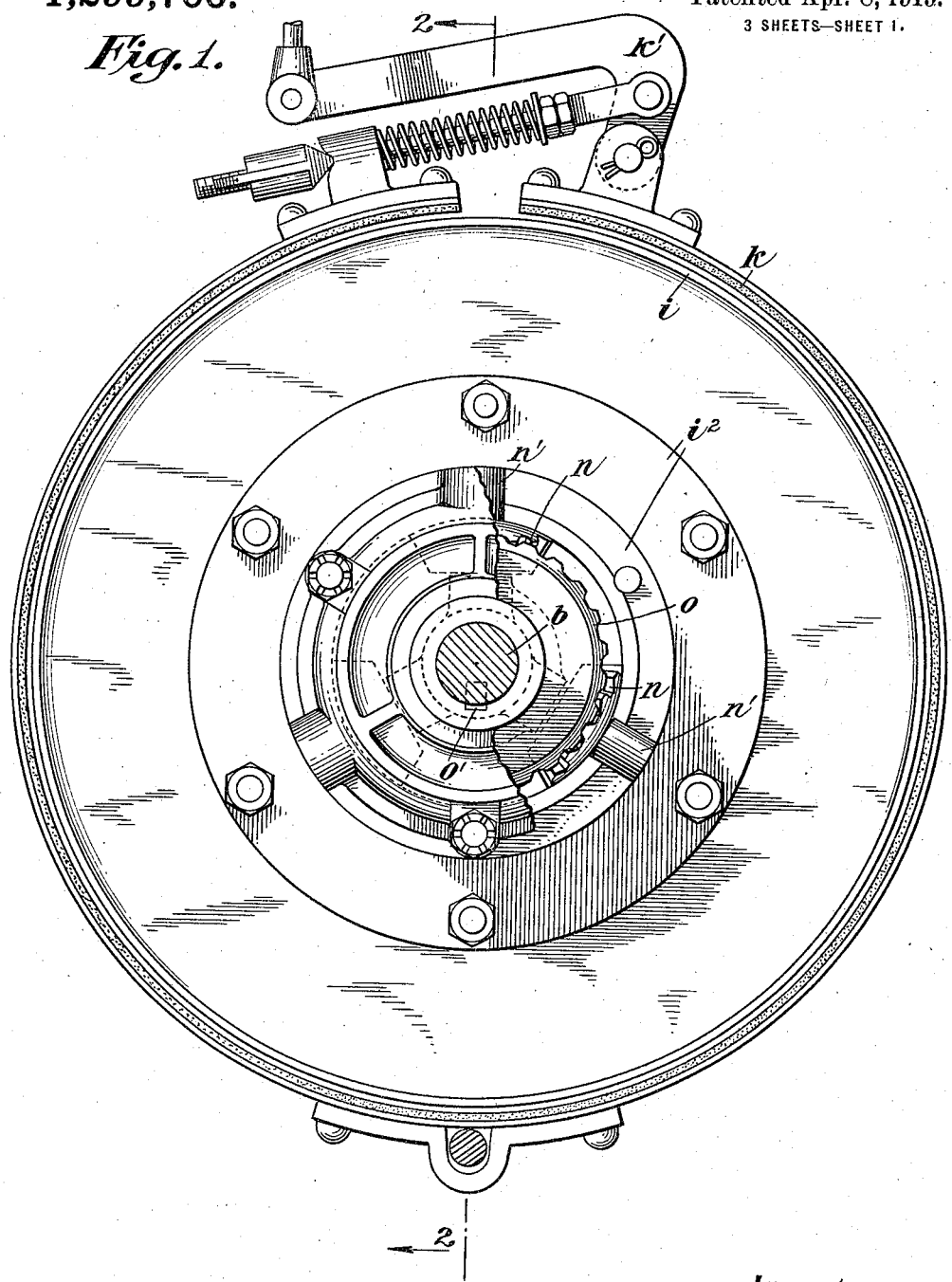
Figure 1 is a view of the improved gearing in end elevation, as seen from the left hand in Fig. 1, a portion of the housing being broken out.

In the embodiment of the invention illustrated in the drawings, the driving shaft $a$ and the driven shaft $b$ are supported in alinement, with their ends abutting.

Fixed to the driving shaft $a$ is a collar $b'$ and adjacent to the collar $b'$ is mounted loosely on the shaft $a$ sleeve $c$ which carries a brake drum $d$ provided with a suitable brake band $e$ to be operated by any suitable brake mechanism, such as that indicated at $e'$.

Figure 2:
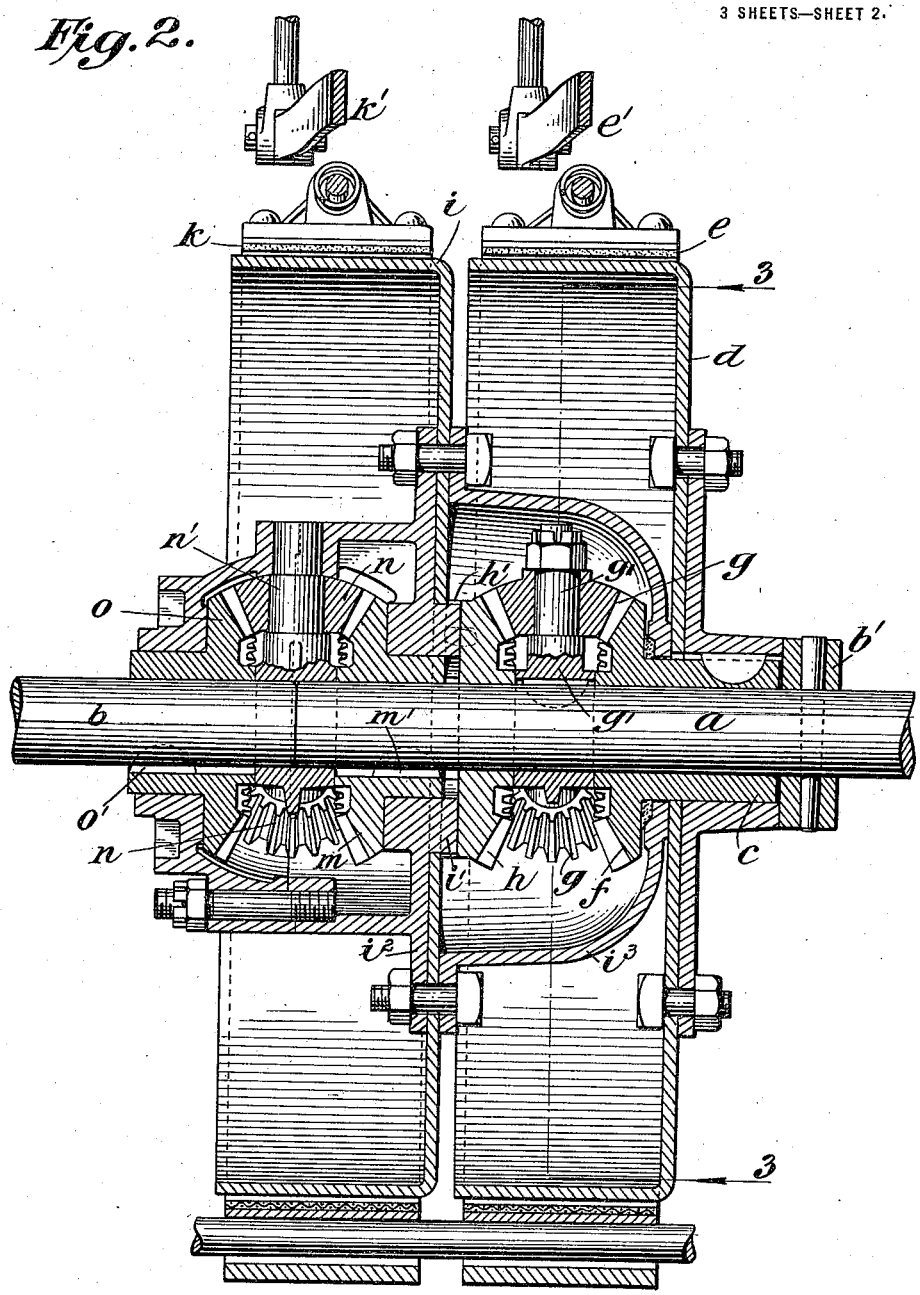
Fig. 2 is a view in longitudinal section on the plane indicated by the line 2—2 of Fig. 1, looking in the direction of the arrows.
Figure 3:
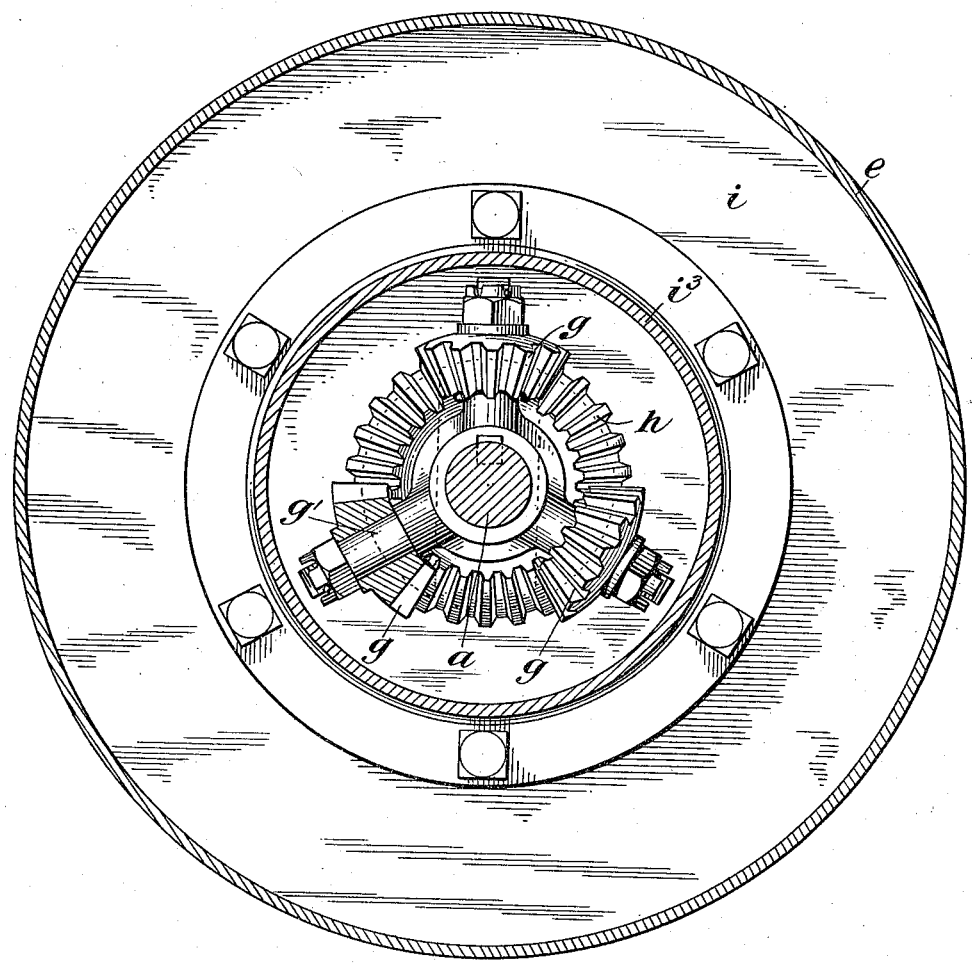
Fig. 3 is a view in section on the plane indicated by the line 3—3 of Fig. 2, looking in the direction of the arrows.

The sleeve $c$ carries the primary gear $f$ of the first planetary gearing which meshes with intermediate pinions $g$ carried by a spider $g'$ which is fixed to the shaft $a$ so as to rotate therewith. The pinions $g$ also mesh with a secondary gear $h$ which is mounted loosely on the shaft $a$ and carries rotatively with it or drives a second brake drum $i$, also provided with a brake band $k$ and suitable brake operating mechanism $k'$. As shown in Fig. 2, the rear face of the gear $h$ is slotted radially, as at $h'$, and the slots are entered by lugs $i'$ on the housing $i^2$ which carries the brake drum $i$, whereby the brake drum $i$ is made to rotate with the gear $h$. A housing $i^3$ may be bolted to the brake drum $i$, so as to inclose the gearing $f$, $g$, $h$ and form a lubricant-retaining chamber therefor.

Fixed on the shaft $a$, as by a feather $m'$, is the primary gear $m$ of the second planetary gearing, on the hub of which the housing or carrier $i^2$ may be mounted. The gear $m$ meshes with intermediate pinions $n$ carried by a spider $n'$ which, in turn, is carried by the housing $i^2$. The pinions $n$ mesh in turn with a secondary gear $o$ which is fixed, as by a feather $o'$, on the shaft $b$.

For a given speed of rotation of the shaft $a$, in one direction, the direction and the speed of rotation of the shaft $b$ is determined by the application of one or the other of the brakes $e$ and $k$ to the corresponding brake drums $d$ and $i$.

When both brake drums are free to rotate, both sets of gearing run idly and the rotation of the shaft $a$ produces no effect on the shaft $b$. When the brake drum $i$ is free and the brake drum $d$ is held from rotation by the brake band $e$, the spider $g'$ rotates with the shaft $a$, the gear $h$ (it being assumed that the gears $f$ and $h$ are of equal size and that the gears $m$ and $o$ are of equal size) rotates at twice the speed of the shaft $a$, the gear $m$ rotates at the same speed as the shaft $a$, the spider $n'$ rotates at the same speed as the gear $h$, that is, at twice the speed of the shaft $a$ and in the same direction, and the gear $o$ and the shaft $b$ rotate at one and one half times the speed of rotation of the spider $n'$ and in the same direction, so that under these conditions the shaft $b$ rotates at three times the speed of the shaft $a$ and in the same direction. By relieving the brake pressure on the brake drum $d$ so that the brake drum is permitted to slip under the brake, the gear $f$ will be permitted to rotate and the speed of the shaft $b$ will be slowed down, according to the rotation of the gear $f$, from its maximum speed to zero when the gear $f$ is permitted to rotate freely. In this manner any desired speed ahead of the shaft $b$ between zero and the maximum can be secured.

Assuming now that the brake drum $d$ is free to rotate and that the brake drum $i$ and therefore the spider $n'$ are held from rotation, the gear $f$ and pinions $g$ rotate idly, the gear $h$ is held from rotation, the gear $m$ rotates with the shaft $a$, the gear $o$ rotates in a direction opposite to that of the gear $m$ but at the same speed and the shaft $b$ therefore rotates in the reverse direction, but at the same speed as the shaft $a$. By relieving the brake band $k$ and permitting the brake drum $i$ and the spider $n'$ to rotate, any desired speed of rotation in the reverse, between the maximum and zero, can be secured.

It will be understood that any suitable type of planetary gearings may be employed and that the details of construction and arrangement of the parts may be varied to suit different conditions of use or the convenience of the manufacturer without departing from the spirit of the invention as set forth in the accompanying claims.

I claim as my invention:

1. Transmission gearing comprising a driving shaft, a driven shaft, two planetary gearings, the intermediate pinions of the second gearing rotating with the secondary gear of the first gearings, means to restrain or permit at will the rotation of the primary gear of the first gearing and means to restrain or permit at will the revolution of the intermediate pinions of the second gearing, the primary gear of the first gearing and the primary gear of the second gearing being mounted to rotate independently of each other.

2. Transmission gearing comprising a driving shaft, a driven shaft, a primary gear of a first planetary gearing mounted loosely on the driving shaft, means to restrain or permit at will the rotation of said primary gear, intermediate pinions in mesh with said primary gear and mounted to revolve with the driving shaft, a secondary gear in mesh with said intermediate pinions and mounted loosely on the driving shaft, a second primary gear fixed on the driving shaft, a second set of intermediate pinions mounted to revolve with said secondary gear and in mesh with the last named primary gear, means to restrain or permit at will the revolution of said second set of intermediate pinions and a second secondary gear in mesh with said second set of intermediate pinions and fixed on the driven shaft.

3. Transmission gearing comprising a driving shaft, a driven shaft, two planetary gearings, the intermediate pinions of the second gearing rotating with the secondary gear of the first gearing, and means to restrain or permit at will the rotation of the primary gear of the first gearing, the primary gear of the first gearing and the primary gear of the second gearing being mounted to rotate independently of each other.

This specification signed this 12th day of January, A. D. 1918.

PERCIVAL F. GIFFORD.

Copies of this patent may be obtained for five cents each, by addressing the "Commissioner of Patents, Washington, D. C."